United States Patent
Morgue et al.

(10) Patent No.: US 9,500,544 B2
(45) Date of Patent: Nov. 22, 2016

(54) PROCESS FOR CHECKING THAT FULL THREADS ARE ENGAGED IN TIGHTENING AND ASSEMBLY

(71) Applicant: Airbus Operations (S.A.S.), Toulouse (FR)

(72) Inventors: Patricia Morgue, Colomiers (FR); Manuel Paredes, Balma (FR); Sophie Gourdon, Blagnac (FR); Simon Dols, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/978,711

(22) Filed: Dec. 22, 2015

(65) Prior Publication Data

US 2016/0187213 A1 Jun. 30, 2016

(30) Foreign Application Priority Data

Dec. 23, 2014 (FR) ..................................... 14 63258
Mar. 18, 2015 (FR) ..................................... 15 52240

(51) Int. Cl.
| | |
|---|---|
| *G01L 3/02* | (2006.01) |
| *G01L 5/00* | (2006.01) |
| *B23P 19/06* | (2006.01) |
| *B25B 23/14* | (2006.01) |
| *F16B 31/02* | (2006.01) |
| *G01L 5/24* | (2006.01) |
| *G01L 5/26* | (2006.01) |

(52) U.S. Cl.
CPC ............ *G01L 5/0042* (2013.01); *B23P 19/066* (2013.01); *B25B 23/14* (2013.01); *F16B 31/02* (2013.01); *G01L 5/0076* (2013.01); *G01L 5/24* (2013.01); *G01L 5/26* (2013.01)

(58) Field of Classification Search
CPC ............ B25B 23/14; Y10T 29/49766; Y10T 29/49948; G01L 5/24; G01L 5/0042; G01N 11/14; G01N 2011/145
USPC ................................. 73/761, 862.21–862.24
See application file for complete search history.

(56) References Cited

U.S. PATENT DOCUMENTS

| | | | | |
|---|---|---|---|---|
| 4,023,406 A | * | 5/1977 | Benz, Jr. ................ | B25B 23/14 173/182 |
| 4,102,182 A | * | 7/1978 | Brown .................. | G01L 5/0042 73/761 |
| 4,375,121 A | * | 3/1983 | Sigmund ................ | B25B 23/14 173/176 |
| 4,375,122 A | * | 3/1983 | Sigmund ................ | B25B 23/14 29/240 |
| 4,685,050 A | * | 8/1987 | Polzer .................... | B25B 23/14 173/183 |
| 5,396,703 A | * | 3/1995 | Rice ...................... | B23P 19/066 29/407.08 |

OTHER PUBLICATIONS

French Search Report for Application No. 1463258 dated Oct. 28, 2015.
European Search Report for Application No. 15202130 dated May 25, 2016.

* cited by examiner

*Primary Examiner* — Max Noori
(74) *Attorney, Agent, or Firm* — Jenkins, Wilson, Taylor & Hunt, P.A.

(57) ABSTRACT

A process for checking when tightening a threaded fastener that it has been tightened on the complete threads of the fastener. In order to do this the process comprises detecting different gradients in a tightening graph representing torque as a function of another parameter and comparing each gradient with predetermined values. According to the portions of graph detected and their gradient values it is possible to determine whether tightening is correct and has taken place on the complete threads of the fastener, or if not it is possible to identify a cause of failure.

5 Claims, 3 Drawing Sheets

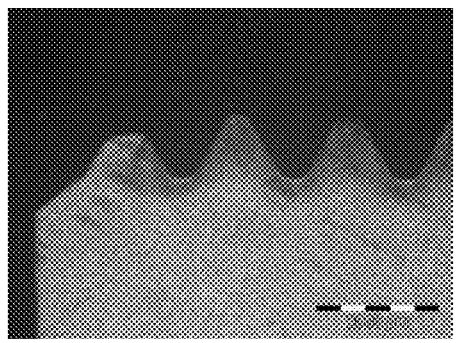
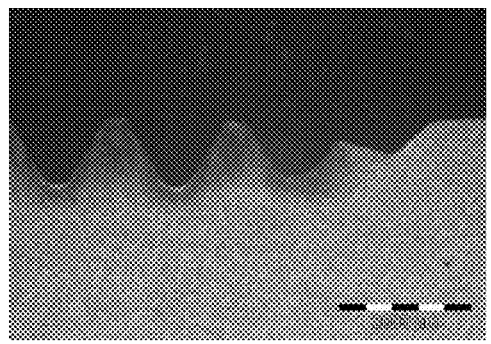
Fig. 1a)    Fig. 1b)
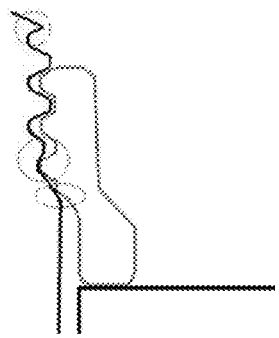
Fig. 2
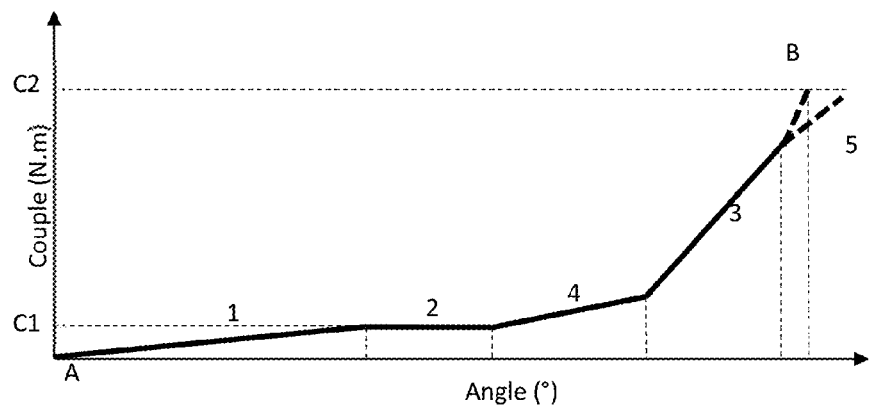
Fig. 3

PROCESS FOR CHECKING THAT FULL THREADS ARE ENGAGED IN TIGHTENING AND ASSEMBLY

CROSS-REFERENCE TO RELATED APPLICATION

This application claims priority to French Patent Application No. FR 1463258 filed Dec. 23, 2014, the entire disclosure of which is incorporated by reference herein.

TECHNICAL FIELD

This application relates to a process for automatically checking tightening during assembly, in particular of a threaded fastener, and more specifically a process for checking that threads are fully engaged when tightening an assembly.

The checks normally made are often insufficient to ensure quality of assembly.

BACKGROUND

The French patent application filed under No. FR 1262503 which describes a process for checking contact is for example known. In this case it is a matter of detecting changes in gradient reflecting the making of contact between the fastening component and the parts being assembled, any intermediate stage suggesting the possibility of prior play between the parts which are to be assembled, followed by tightening. It is then possible to consider whether, if the intermediate stage has not been detected, for example when the gradient of the tightening stage is correct, the parts are properly in contact; but if this intermediate stage is detected, it suggests play between the parts being assembled; assembly is then correct if the tightening gradient is consistent with expectations; if not a problem with contact has been detected.

Checking for the existence of these various stages makes it possible to be more sure that when the checked gradient is consistent with expectations it actually corresponds to proper tightening and is not an artefact associated with a problem in assembling the parts together.

In the context of threaded fasteners, such as for example a bolt, that is to say a bolt with a nut, it is also preferable to be able to ensure that tightening takes place on the properly formed threads of the bolt, that is to say away from those regions where the threads are incomplete or incorrectly formed which might occur at the two ends of the threaded portion of the shank of the bolt, and where there is no contact between the nut and a transitional portion of the bolt, that is to say the portion at the end of the thread, before the smooth part between the thread and the head of the bolt.

In addition to this it is advantageous to be able to carry out the check in real time, best avoiding additional action on the part of an operator.

At the present time the checking process comprises using wedges which enable the operator to check the geometrical parameters reflecting proper fastening. For this purpose the operator places a wedge in contact with the bolt, and if the geometric criteria corresponding to the specified conditions are complied with the wedge will not touch the parts which have to be checked. However if washers are used it can happen that they are of insufficient diameter for the operator to fit a wedge. This means that the assembly has to be dismantled so that the washer can be replaced, even if assembly was correct. In addition to this the operator generally needs to have on him a set of wedges corresponding to all the diameters which he has to tighten, often on the basis of different standards. In order to avoid one set of wedges for each standard it is possible to establish a general set of wedges, but this is less tolerant and therefore rejects a larger number of correct assemblies, which as a consequence results in more dismantling.

SUMMARY

This disclosure herein is intended to provide an improved checking process which also leads to other advantages.

In this regard, in accordance with a first aspect, a process is provided for checking that full threads are engaged when an assembly comprising at least a first part and a second part and a threaded fastener formed of a first component and a second component is tightened, the process comprising at least the following stages:

- a stage of measuring at least one torque from a tightening torque and a reaction torque in the threaded fastener while one of the components of the threaded fastener is kept fixed;
- a stage of measuring another parameter, other than torque, preferably a time, an axial displacement or again an angle of rotation between the first and second components;
- a stage of determining a function representing a change in torque relative to the other parameter for torque values between 0 and the final torque value;
- a stage of analyzing the function comprising:
- a stage of identifying the portions of the function, the portions together forming the function, and their corresponding gradient values;
- a stage of comparing the gradient value for each portion of the function with each of the previously determined gradient values of a first theoretical and/or experimental reference function characteristic of correct defect-free assembly and with each of the predetermined gradient values of a second theoretical and/or experimental reference function characteristic of incorrect assembly with tightening on incorrectly formed threads; and
- a checking stage comprising:
- checking that the value of the gradient of a portion of the function is zero, this portion of the function forming a non-zero plateau in relation to values of the other parameter;
- checking that the value of the gradient of a last portion of the function defined after the portion forming the plateau in the case of torques equal to at least the torque of the portion forming the plateau is equal to a gradient value characteristic of correct assembly;
- checking that none of the values for the gradients of the portions of function defined after the portion forming the plateau is equal to a gradient value of the second reference function corresponding to tightening on incorrectly formed threads; and if at least one of the checks in the checking stage is not satisfactory, the process comprises a stage informing that tightening has not been carried out correctly.

The fact that a check is satisfactory is here understood to mean that the checked criteria have been met.

As previously mentioned, the complete threads on a bolt here correspond to the threads which are assumed to be correctly formed, that is to say outside the regions where the threads are incomplete or incorrectly formed, which might be at the two ends of the threaded portion on the shank of the bolt, a bolt generally incorporating a transitional portion, that is to say the portion at the end of the thread before the smooth part between the thread and the head of the bolt.

Thus the process comprises a stage of comparing the value of the gradient of each portion of the function considered with each of the predetermined gradient values of a first theoretical and/or experimental reference function characteristic of correct defect-free assembly, and also with each of the previously determined gradient values of a second theoretical and/or experimental reference function characteristic of incorrect assembly with tightening on incorrectly formed threads.

In other words, at least two different functions are determined in advance: one characteristic of correct assembly, the other characteristic of incorrect assembly.

Such a process thus not only makes it possible to check whether tightening is correct but also whether tightening has occurred on complete threads of the threaded fastener. The process thus makes it possible for a check to be made in real time when tightening and thus avoid a stage of checking after assembly, resulting in a possible time saving. In addition to this the operator no longer needs to have on him a set of wedges corresponding to all the diameters which he has to tighten. Additional action on the part of the operator is thus also avoided.

According to one embodiment the checking stage comprises checking that a first portion of a function is present, this first portion of a function preceding the portion of the function forming the plateau, and checking that the first portion of the function has a positive, that is to say a non-zero, gradient.

According to one embodiment the stage of identifying the portions of the function comprises the following stages:
 a stage of determining a first inflexion point corresponding to an initial torque value—that is to say the torque value from which measurement is started, that is 0 or any other torque value—and a final inflexion point corresponding to a final torque value—that is to say the torque value at which measurement stops;
 a stage of seeking and identifying at least one intermediate inflexion point located between the first inflexion point and the last inflexion point;
 a stage of defining a portion of the function between two consecutive inflexion points;
 a stage of linear extrapolation of each portion of the function;
 a stage of calculating a gradient value characterizing each linear extrapolation of each portion of the function.

According to one embodiment the checking stage comprises a check that there are no more than two portions of the function after the portion forming the plateau, and if this check is not satisfactory, the process comprises a stage informing that there is a risk that tightening is incorrect.

In accordance with one embodiment the process comprises:
 a stage of measuring the tightening torque and the reaction torque;
 a stage of comparing the tightening torque and the reaction torque with at least one experimentally and/or theoretically predetermined reference situation; and
 if the comparison stage is not satisfactory—that is to say if the tightening torque and the reaction torque differ from the reference values corresponding to the reference situation by more than an associated tolerance range, for example plus or minus 10% or 5% around the reference value considered—the process comprises a stage warning that tightening is incorrect.

For example this may be an excessive torque originating from contact between a nut and a bolt in the transitional portion, the warning stage then making it possible to give warning that the fastener might be damaged.

BRIEF DESCRIPTION OF THE DRAWINGS

An object of this disclosure herein will be better understood and its advantages will be more apparent from a reading of the following description with reference to the appended drawings, in which:

FIGS. 1a) and 1b) illustrate the two ends of the thread of a bolt;

FIG. 2 shows diagrammatically contact between a nut and a transitional portion of the thread of the bolt;

FIG. 3 shows diagrammatically a tightening graph comprising different portions corresponding to different stages which might occur during tightening, contact in the transitional portion taking place after effective tightening;

DETAILED DESCRIPTION

Figure 4:
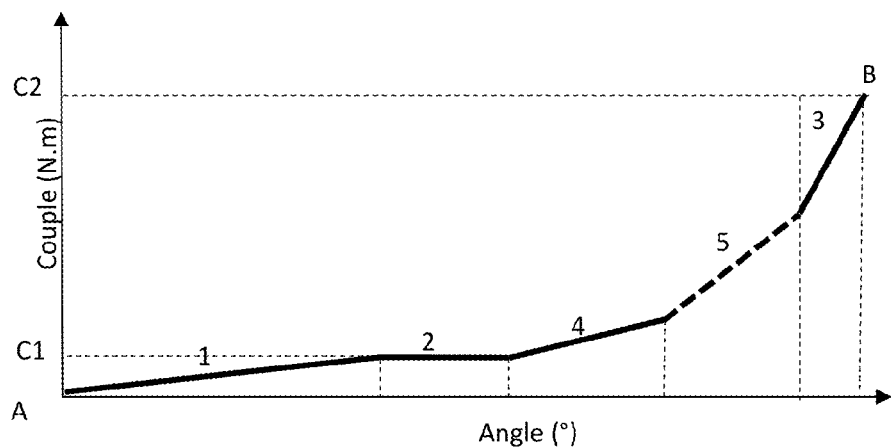
FIG. 4 diagrammatically shows a tightening graph comprising different portions corresponding to different stages which might occur during tightening in which contact in the transitional portion takes place before effective tightening once play between the plates has been taken up.

In the context of threaded fasteners, such as for example a bolt, that is to say a bolt with a nut, it is advantageous to be able to ensure that it is tightened on the properly formed threads of the bolt, that is to say outside the regions where threads are incomplete or incorrectly formed, which might be at the two ends of the threaded portion of the shank of the bolt, and that there is no contact between the nut and a transitional portion of the bolt, that is to say the portion at the end of the thread, before the smooth part located between the thread and the head of the bolt. In other words, it is preferable that 1) only complete threads should engage the nut and 2) there should be no contact between the nut and the transitional portion of the bolt. In this way the performance of the assembly can be guaranteed. The threads may in fact be incomplete or incorrectly formed at both ends of a threaded portion.

The first condition thus makes it possible to check securing of the nut (its resistance to loosening). In fact, in order for the nut to be better secured it might be slightly deformed in manufacture. The additional friction provided by this deformation in contact with the threads of the bolt prevents the nut from being prematurely loosened. If the thread next to the nut is incomplete, less friction will be exerted. There may therefore be a risk that it will loosen through the effect of vibration. For it to be as secure as possible the surface area of contact between the threads must be as large as possible, hence this first condition. This is reflected in the establishment of a torque, the securing torque, which the operator must add in addition to the useful tightening torque. This torque increases as tightening progresses, as more perfectly formed threads are engaged, up to a threshold value when all the threads of the nut are engaged with correctly formed threads. This aspect can be checked visually when assembly is in progress, when the first thread of the bolt projects beyond the nut.

In addition to this, at the end of the thread (towards the head of the bolt, shown in FIG. 1b)) the depth of the incorrectly formed threads is shallower than the rest of the thread. Thus if tightening continues into this portion, the threads of the nut will come into contact with the end of the threads on the bolt and will deform, as for example illustrated in FIG. 2. These threads correspond to the transitional portion of the bolt, located between the properly threaded part and the smooth part of the shank of the bolt. If the nut is not correctly selected there is a risk that the transitional portion of the bolt will be in contact with the nut.

These different stages are for example reflected visually in a graph showing a change in torque, for example the tightening torque, as a function of another tightening parameter, such as for example angle, time, displacement or deformation.

Such a graph is illustrated in FIG. 3, which shows tightening torque (as the ordinate) as a function of angle (as the abscissa). In this description the relationship between tightening torque and angle will be used to illustrate the process which is the subject matter of this application, but this description will apply for any other measurable pair, whether a tightening torque or a reaction torque in the threaded fastener when one of the components of the threaded fastener is fixed: torque/time, torque/displacement, or any other.

The graph in FIG. 3 here includes five portions, numbered from 1 to 5, representing the following stages:

A first portion, or portion 1, is the portion starting from a first inflection point A, formed at coordinates (0, 0), that is to say at the origin of the graph. In this portion the torque increases until it reaches a value C1 corresponding to a securing torque. This portion 1 represents securing of the nut when it is threaded onto the bolt up to the point where all the threads of the nut engage complete threads of the bolt.

A second portion, or portion 2, is the portion representing a plateau. This plateau extends over different abscissa values, here angle, while the value of the torque representing securing torque C1 is substantially constant. The second portion forming a plateau appears after portion 1. This portion corresponds to the threads of the nut engaging complete threads of the bolt, before the assembly begins to be tightened up, illustrated by portion 3. The presence of a plateau makes it possible to ensure that the assembly is secured to its nominal value and therefore that the first incorrectly formed threads have projected beyond the nut. In fact for the securing value to be reached all the threads engaging within the locked part must be correctly formed.

The third portion, or portion 3, is located after portion 2, or after portion 4 if a portion 4 is present. Portion 3 is the portion representing effective tightening.

The fourth portion, or portion 4, if present, is located between portion 2 and portion 3. This is the portion representing the possible take-up of play between the parts being assembled. Thus for example if there is no play between the parts being assembled, portion 4 is not present in the tightening graph for the assembly in question.

The fifth portion, or portion 5, if present, is for example (as is the case here) the last portion of the graph, that is to say the portion extending up to a point B of torque C2 which represents a final torque value, a target torque. In FIG. 3 this is located after portion 3, but this portion is not subordinate to the preceding portions. Here it represents tightening when there is contact between the nut and the bolt on incorrectly formed threads of the bolt, in particular on the transitional portion, that is there is overtightening.

The course of the function is not known in advance, as it depends on the overall stiffness of the assembly (gradient corresponding to tightening).

Figure 8:
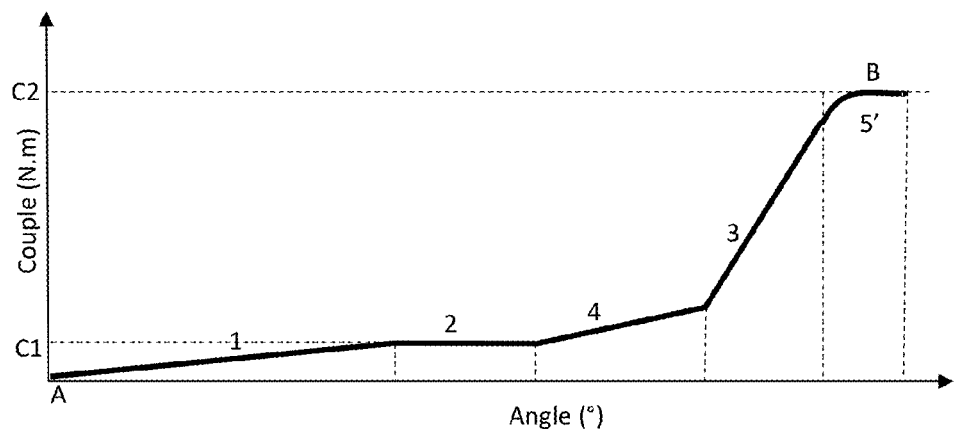
FIG. 8 diagrammatically shows a tightening graph comprising different portions corresponding to different stages which might occur during tightening in a case where plastic deformation of the assembly occurs.

As FIG. 8 shows, it may happen that the fifth portion does not have a stiffer gradient than tightening but on the other hand that there is a fall in gradient, even a horizontal asymptote. In this case the fifth portion, then designated 5', reflects plastic deformation of the assembly, which must also be avoided for proper fastening.

Figure 5:
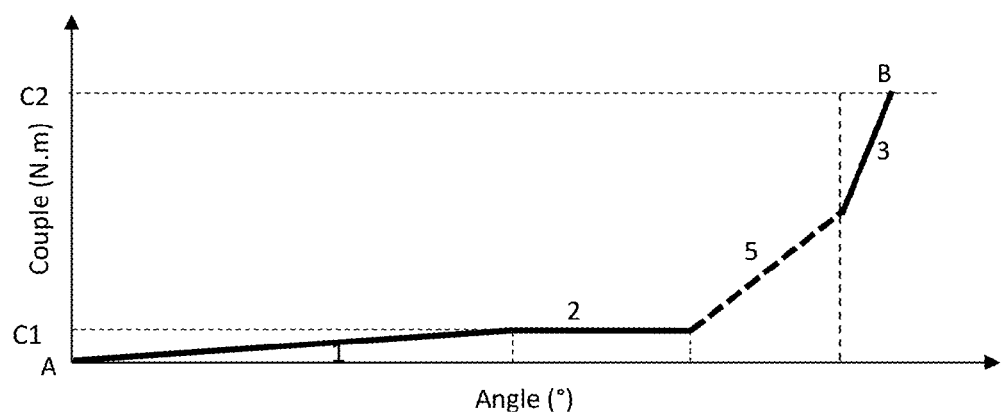
FIG. 5 illustrates a first tightening situation in which contact in the transitional portion takes place before effective tightening without any play.

According to another example illustrated for example in FIGS. 4 and 5, it is also possible that portion 5 may appear before portion 3, for example between portions 4 and 3, or 2 and 3 in a situation where there is no play.

In order to establish that at least the abovementioned conditions arise when making an assembly, a checking process will include for example the following stages:
  a stage of measuring a torque, for example here the tightening torque, but it may of course be a reaction torque in the threaded fastener;
  a stage of measuring another parameter, other than torque, preferably time, axial displacement or again angle of rotation between the first and second parts;
  a stage of determining a function representing a change in torque in relation to the other parameter for all torque values between an initial value, which may be 0 in a particular situation where the measurements are made right at the start of assembly, and a final torque value, at which measurement is stopped;
  a stage of analyzing the function comprising:
    a stage of identifying portions of the function, all of the portions making up the function, and the values of their respective gradients;
    a stage of comparing the value of the gradient for each portion of the function with each of the values of the gradients of a first predetermined theoretical and/or experimental reference function characteristic of proper defect-free assembly and with each of the values of the gradients of a second predetermined theoretical and/or experimental reference function characteristic of incorrect assembly with tightening on incorrectly formed threads;
  a checking stage, comprising:
    optionally, depending upon the torque from which the initial measurements are made, checking for the possible presence of a portion of the function having a positive non-zero gradient which would then be located in front of a portion forming a plateau; in this situation this portion would correspond to the first portion mentioned above;
    checking that the value of the gradient of a portion of the function is zero, this portion of the function forming a non-zero plateau in relation to the values of the other parameter, checking that this portion corresponds to securing of the nut on complete threads of the bolt, that is to say portion 2 mentioned above;
    checking that the value of the gradient of a portion of the function defined to be between the portion of the function forming the plateau and the final torque in the case of torques which are equal to at least the torque in the portion forming the plateau is equal to a tightening value in the reference graph corresponding to correct tightening, to check that a tightening stage has actually taken place, this portion then corresponding to portion 3 mentioned above;

optionally, checking that the value of the gradient of a possible portion of the function defined to be between the portion of the function forming the plateau (portion 2) and portion 3 is not equal to a tightening value of the reference curve corresponding to tightening on incorrectly formed threads, this portion then corresponding to portion 4 mentioned above; and checking that the portion of the graph corresponding to portion 3 includes the final torque, to check that the tightening stage is actually the last stage carried out and that for example there is no stage of subsequently occurring undertightening.

If the checks in the checking stage are satisfactory, the process comprises a stage of checking that tightening has been correctly performed on the complete threads of the threaded fastener.

Here checking whether a gradient is equal to a predetermined value implies checking that the gradient lies at least within a range or range of tolerance around that value, for example +/−5%. This applies of course to any check on values in relation to theoretically and/or experimentally predetermined values.

Using the changes in the gradients of the graph it is thus possible to describe the various events which take place during tightening.

The process thus allows a check that is detection and monitoring of particular stages corresponding to different portions of graphs in order to interpret the function with a view to knowing the condition of the assembly.

If the aforethe checks are not satisfactory, then the process may include a stage informing that tightening is incorrect, and in addition to this, as a result of comparing the different portions detected to predetermined values it is possible to identify a cause of the problem. In other words, depending upon the stages detected, that is to say the portions of the function which have been identified, it is then possible to know whether assembly has been correctly made on the threads of the threaded fastener or to be able to identify the cause resulting in an assembly problem.

The process thus makes it possible to focus on the behavior of the threads when they engage.

The different gradients and associated comparisons are for example identified using an algorithm. This may for example be directly incorporated in a tool of the tightening device or a monitoring unit or otherwise. Thus a response in the form of a signal, which may be a light, sound or again a digital signal, or a combination thereof, may be transmitted directly to the operator, telling him whether all the checked parameters are satisfactory and that therefore tightening is correct.

As a result of the process, observing changes in successive gradients and comparing the value of the driving coefficient with a reference value, makes it possible to avoid contentious situations.

One example of a contentious situation is provided in FIG. 5. The graph in FIG. 5 includes two portions beyond the plateau of portion 2 (as portions 1 and 2 are easier to identify they will not be further discussed in the context of this example). By comparing the values of the gradients for these two portions with theoretical and/or experimental values it can be established that these two portions successively correspond to a stage of tightening in the transitional portion and then a tightening stage. If not, it would be for example possible to confuse them with a stage of taking up play and a stage of tightening respectively; in that case it might be concluded that tightening was correct, whereas in reality the situation corresponds to assembly which is initially without play, in which tightening has taken place on the transitional portion of the bolt, and is as a consequence incorrect.

Figure 6:
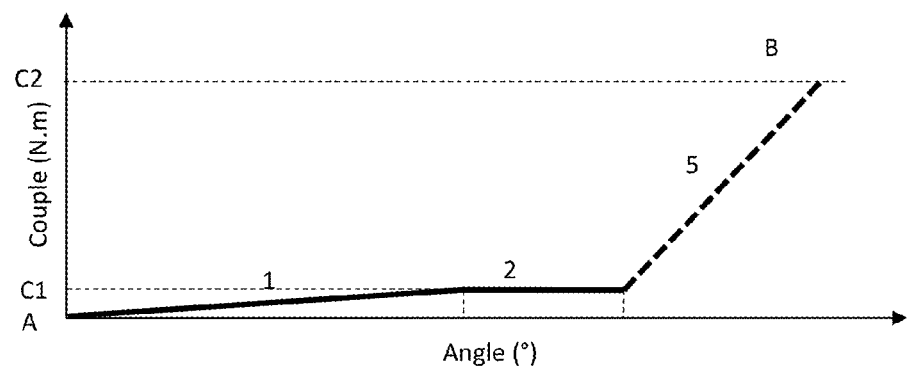
FIG. 6 illustrates a second tightening situation in which contact in the transitional portion occurs without any effective tightening.

Another example of a contentious case is provided by FIG. 6. The graph in FIG. 6 includes a portion beyond the plateau of portion 2 (as portions 1 and 2 are easier to identify they will not be further discussed in the context of this example). In addition to the fact that it can be established that tightening is incorrect because the gradient of this portion differs from the expected tightening value it is possible to establish a reason why tightening is incorrect. This could for example be due to the fact that play has not been taken up between the parts being assembled before target torque C2 is reached, or because tightening has taken place on the transitional portion of the bolt. In the case in point it is the situation where the nut has come into contact with the transitional portion without touching the parts which have to be tightened. It may for example be deduced from this that the bolt was badly shaped or badly chosen, its flat portion between the threaded part and the head being for example too long.

In general, if the first portion or the second portion is not detected or they are detected but their gradient does not conform to expectations, then the process may comprise an information stage indicating that there is an assembly problem, for example in the threading of the threaded fastener or that there is excessive play between the parts being assembled.

The checking stage may possibly first comprise a confirmation that the function has at least three portions, the process comprising a stage of checking whether this confirmation is correct. In addition to this or instead the confirmation stage may also first incorporate a check that the function is uniform and increasing, that is to say that the gradient at every point is the same or greater than zero, the process comprising the confirmation stage if this check is satisfactory. In fact if the graph shows any fall in torque whatsoever, this may also reflect a problem with assembly and the operator can be warned of this.

Thus in this process the entire tightening graph is utilized and not just the portion corresponding to effective tightening of the assembly.

According to one embodiment the process comprises a stage of detecting a first portion of graph having a first positive gradient for all torque values between 0 and a torque value referred to as the securing torque, which is non-zero, this first portion corresponding to securing of the second component when it is threaded onto the first component, a stage of detecting a second portion of graph following the first portion of graph having a second zero gradient, forming a non-zero plateau in relation to values of the other parameter for torque values equal to the value of the securing torque and a stage of detecting at least one third portion of graph, beyond the second portion of graph, having a third positive gradient equal to a predetermined tightening value in relation to torque values between a first torque value which is equal to at least the value of the securing torque and a second torque value which is higher than the first torque value. The process also further possibly comprises a stage of checking that the first portion has been detected, a stage of checking that the second portion has been detected, a stage of checking that a third portion in which the third gradient is equal to the predetermined tightening value has been detected and a stage of checking that the second torque value is equal to the target torque value.

For example, the stage of identifying the portions of the function comprises the following stages:
- a stage of determining a first inflexion point corresponding to an initial torque value, namely 0 if the measurements are made from the very start of assembly, and a final inflexion point corresponding to a torque value equal to the final torque value;
- a stage of seeking and identifying at least one intermediate inflexion point lying between the first inflexion point and the last inflexion point;
- a stage of defining a portion of the function between two consecutive inflexion points;
- a stage of linearly extrapolating each portion of the function;
- a stage of calculating a gradient value characterizing each linear extrapolation of each portion of the function.

According to one embodiment the process comprises the stage of calculating the torque of the second portion of the function, that is to say the one forming the plateau (which might be the first detected if the measurements are not made during the stage corresponding to the first portion), a stage of comparing the torque value of the second portion with a securing torque value of theoretically predetermined function and/or an experimental reference value, which is not zero, and the checking stage further comprises a check that the torque value for the second portion is located within a range around the reference securing torque. The process then comprises the abovementioned confirmation stage if this check is also satisfactory. This stage thus makes it possible to be surer that the plateau actually corresponds to securing of the nut on the complete threads of the bolt.

In order to check whether there is a "fourth" portion effectively corresponding to the take-up of play between the parts being assembled, the process may comprise a stage of checking that a portion, known as the fourth portion, has been identified between the second portion and the third portion, that is to say between the plateau and actual tightening, and whether a fourth portion has been identified between the second portion and the third portion, the confirmation stage then comprising a check that the gradient of the fourth portion is not equal to a tightening value on incorrectly formed threads and if this confirmation stage is satisfactory the process includes a stage informing that the fourth portion corresponds to a take-up of play between at least the first part and the second part being assembled.

Another assembly problem may also be associated with the fact that the tightening stage may not have occurred. In this case the check that the gradient value for the last portion is equal to a tightening value of the predetermined reference function is unsatisfactory. It is then useful to be able to identify why this stage has not taken place. If this is the case it is then advantageous that the confirmation stage comprises a check that the gradient of the last portion is equal to the value of the reference gradient corresponding to tightening beyond the threads and if this confirmation stage is satisfactory the process includes a stage informing that tightening is incorrect and has occurred beyond the threads.

Thus, depending upon the different portions of the graphs identified and the values of their gradients it is possible to ensure that the assembly has been correctly tightened, that tightening has actually taken place on the threads of the fastener, or to ascertain what any possible causes of failure might be.

In order to implement this process one possibility comprises instrumenting a tightening device which measures parameters linked to tightening during the course of tightening a threaded fastener, such as for example torque, angle, time, displacement or deformation.

Figure 7:
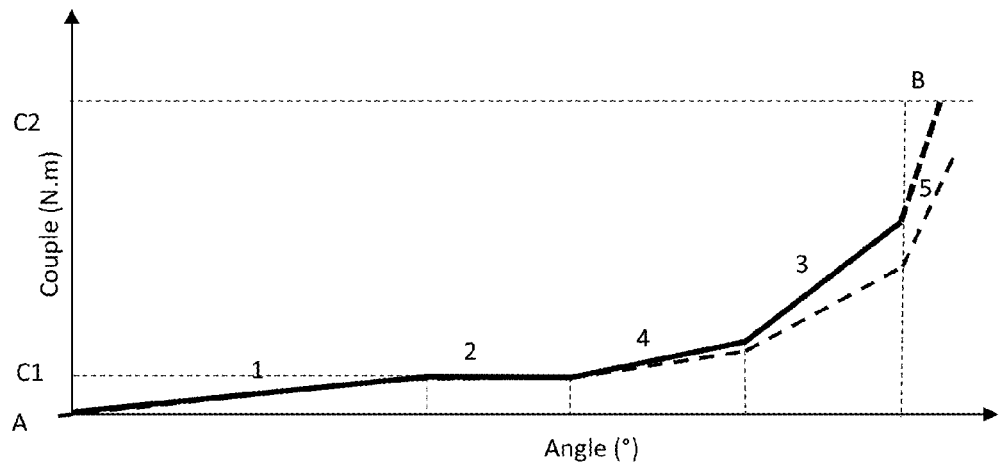
FIG. 7 shows a comparison between a function representing a reaction torque measured in the bolt (dotted line) and a function representing the tightening torque corresponding to the situation in FIG. 3 (solid line)

One option comprises instrumenting a component holding the bolt (immobilizer, spanner or other device) to determine the reaction torque acting upon it. This torque is linked to interactions between the nut and the bolt; it is a direct representation of securing and contact between the nut and the transitional portion of the bolt if this has occurred. Measurement of this torque also provides an indication about the friction coefficient in the threads. Likewise this reaction torque may be compared with a reference value. This is for example illustrated by the dotted line in FIG. 7.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for checking that complete threads are engaged when tightening an assembly comprising at least a first part and a second part and a threaded fastener, comprising a first component and a second component, the process comprising at least the following stages:
- a stage of measuring at least one torque from a coupling torque and a reaction torque in the threaded fastener while keeping one of the components of the threaded fastener fixed;
- a stage of measuring another parameter, other than torque, preferably a time, an axial displacement or again an angle of rotation between the first and second parts;
- a stage of determining a function representing a change in torque in relation to the other parameter for torque values between 0 and the final torque value;
- a stage of analyzing the function comprising:
  - a stage of identifying the portions of the function, the portions together making up the function, and their corresponding gradient values,
  - a stage of comparing the gradient value for each portion of the function with each of the previously determined gradient values of a first theoretical and/or experimental reference function which is characteristic of correct defect-free assembly and with each of the predetermined gradient values of a second theoretical and/or experimental reference function which is characteristic of incorrect assembly with tightening on incorrectly formed threads; and checking stage comprising:

checking that the value of the gradient of a portion of the function is zero, this portion of the function forming a non-zero plateau in relation to values of the other parameter;

checking that the value of the gradient of a last portion of the function defined after the portion forming the plateau for torques which are equal to at least the torque of the portion forming the plateau is equal to a gradient value characteristic of correct assembly;

checking that none of the values for the gradients of the portions of function defined after a portion forming the plateau (2) is equal to a gradient value of the second reference function corresponding to tightening on incorrectly formed threads; and if at least one of the checks in the checking stage is not satisfactory the process comprises a stage informing that tightening has not been carried out correctly.

2. The process according to claim 1 in which the checking stage comprises a check that a first portion of the function is present, this first portion of the function preceding the portion of the function forming the plateau, and a check that the first portion of the function has a positive gradient.

3. The process according to claim 1, in which the stage of identifying the portions of the function comprises the following stages:

a stage of determining a first inflexion point corresponding to an initial torque value and a final inflexion point corresponding to a final torque value;

a stage of seeking and identifying at least one intermediate inflexion point lying between the first inflexion point and the last inflexion point;

a stage of defining a portion of the function between two consecutive inflexion points;

a stage of linear extrapolation of each portion of the function; and a stage of calculating a gradient value characterizing each linear extrapolation of each portion of the function.

4. The process according to claim 1 in which the checking stage comprises a check that there are no more than two portions of the function after the portion forming a plateau, and if this check is not satisfactory the process comprises a stage informing that there is a risk that tightening is incorrect.

5. The process according to claim 1 comprising:

a stage of measuring the tightening torque and the reaction torque;

a stage of comparing the tightening torque and the reaction torque with at least one reference situation which has been predetermined experimentally and/or theoretically; and if the comparison stage is not satisfactory, the process comprises a stage warning that tightening is incorrect.

\* \* \* \* \*